United States Patent
Ayusawa et al.

(10) Patent No.: US 9,739,250 B2
(45) Date of Patent: Aug. 22, 2017

(54) INTERNAL COMBUSTION ENGINE IGNITION DEVICE

(71) Applicant: KOKUSAN DENKI CO., LTD., Numazu-shi, Shizuoka (JP)

(72) Inventors: Takuma Ayusawa, Tokyo (JP); Yushi Suzuki, Tokyo (JP); Masayuki Sugiyama, Tokyo (JP); Yuichi Kakehashi, Tokyo (JP)

(73) Assignee: KOKUSAN DENKI CO., LTD., Shizuoka (JP)

( * ) Notice: Subject to any disclaimer, the term of this patent is extended or adjusted under 35 U.S.C. 154(b) by 0 days.

(21) Appl. No.: 14/781,052

(22) PCT Filed: Apr. 1, 2014

(86) PCT No.: PCT/JP2014/059621
§ 371 (c)(1),
(2) Date: Sep. 29, 2015

(87) PCT Pub. No.: WO2014/163071
PCT Pub. Date: Oct. 9, 2014

(65) Prior Publication Data
US 2016/0047349 A1 Feb. 18, 2016

(30) Foreign Application Priority Data

Apr. 3, 2013 (JP) .................. 2013-077733

(51) Int. Cl.
*F02P 1/08* (2006.01)
*H01F 38/12* (2006.01)
(Continued)

(52) U.S. Cl.
CPC ............. *F02P 1/083* (2013.01); *F02P 5/1551* (2013.01); *H01F 38/12* (2013.01); *F02N 3/00* (2013.01);
(Continued)

(58) Field of Classification Search
CPC .... F02P 1/02; F02P 1/083; F02P 3/051; F02P 5/15; F02P 5/1502; H01F 38/12
(Continued)

(56) References Cited

U.S. PATENT DOCUMENTS 3,587,550 A * 6/1971 Zechlin ...................... F02P 7/03
123/146.5 A
4,160,435 A * 7/1979 Sleder ...................... F02P 7/035
123/149 D
(Continued)

FOREIGN PATENT DOCUMENTS

JP 2006-017068 A 1/2006
JP 2006-328959 A 12/2006
(Continued)

OTHER PUBLICATIONS

JP 2006-328959 English Translation Version.*
International Search Report of PCT/JP2014/059621.

*Primary Examiner* — John Kwon
*Assistant Examiner* — Johnny H Hoang
(74) *Attorney, Agent, or Firm* — Mattingly & Malur, PC

(57) ABSTRACT

The internal combustion engine ignition device has a core, a coil part that is wound over the core, and a secondary coil that is wound on the outer peripheral side of the coil part. A switching element switches an induced current, which is generated via the rotation of a permanent magnet, of a primary coil on and off. A resistor and a microcomputer are connected to the switching element, and a rotation detection circuit is connected to the microcomputer. The microcomputer drives the switching element so as to rapidly change the current flowing through the primary coil and generate a high voltage in the secondary coil, and generate a spark discharge in a spark plug connected to the secondary coil. In the coil part, one coil is divided by an intermediate tap, forming the primary coil and a charging coil.

6 Claims, 4 Drawing Sheets

(51) Int. Cl.
*F02P 5/155* (2006.01)
*F02P 3/05* (2006.01)
*F02P 1/02* (2006.01)
*F02P 5/15* (2006.01)
*F02N 3/00* (2006.01)

(52) U.S. Cl.
CPC .............. *F02P 1/02* (2013.01); *F02P 3/051* (2013.01); *F02P 5/1502* (2013.01)

(58) Field of Classification Search
USPC .......... 123/406.23, 594, 599, 605, 621, 644
See application file for complete search history.

(56) References Cited

U.S. PATENT DOCUMENTS

| | | | | |
|---|---|---|---|---|
| 4,501,256 | A * | 2/1985 | Dykstra | F02P 1/083 123/651 |
| 5,161,496 | A * | 11/1992 | Matsushima | F02D 41/062 123/149 D |
| 5,549,090 | A * | 8/1996 | Blount | F01C 9/007 123/406.6 |
| 2004/0025839 | A1* | 2/2004 | Kashibata | F02P 1/08 123/406.47 |
| 2004/0154592 | A1* | 8/2004 | Fujima | F02P 3/093 123/406.57 |
| 2008/0191700 | A1* | 8/2008 | Shimazaki | F02P 17/00 324/382 |
| 2009/0126686 | A1* | 5/2009 | Sugiyama | F02P 1/005 123/406.57 |
| 2014/0230787 | A1* | 8/2014 | Mezaki | B27B 17/083 123/406.52 |
| 2014/0318488 | A1* | 10/2014 | Kawagoe | F02P 1/08 123/143 B |

FOREIGN PATENT DOCUMENTS

| | | |
|---|---|---|
| JP | 2009-156203 A | 7/2009 |
| JP | 2010-180854 A | 8/2010 |

* cited by examiner

INTERNAL COMBUSTION ENGINE IGNITION DEVICE

TECHNICAL FIELD

The present invention relates to an internal combustion engine ignition device, and more particularly, the present invention relates to an internal combustion engine ignition device suitable for a general purpose engine of recoil starter type.

BACKGROUND ART

Conventionally, a general purpose engine is configured that a flywheel and the like connected to a crankshaft of the engine is provided with a permanent magnet only at a single location in the circumferential direction, and a magnet generator is provided opposite the permanent magnet. The magnet generator includes an ignition coil having a primary coil wound over an outer peripheral side of a core, and a secondary coil is further wound on an outer peripheral side of the primary coil. The primary current is applied to the ignition coil at a voltage induced in the primary coil. The primary current is then cut off to obtain high voltage for ignition purpose.

Patent Literature 1 discloses an example of the ignition device used for the conventional general purpose engine. The disclosed ignition device for engine has a capacitor disposed at a primary side of the ignition coil so that the charging circuit charges the capacitor at the forward induced voltage in the primary coil of the ignition coil. A plurality of switches are provided for the discharging circuit of the capacitor. Those switches are sequentially turned on at the position having the phase advanced from the engine ignition position. At the ignition position, those switches are turned off.

Patent Literatures 2 to 4 disclose other examples of the generally employed engine ignition device. Patent Literature 2 discloses the ignition device intended to have a simplified and compact structure by eliminating the pulser coil. Such structure is established by allowing the main part of the voltage generated in the primary winding to be applied for ignition energy, and the sub part of the voltage to be applied for the power source and the rotation pulse generation source. The microcomputer controls the ignition timing by the signal transmission means with different polarity. Patent Literatures 3 and 4 disclose the ignition device which secures the minimum output at the ignition timing by detecting the proportional voltage of the trigger coil.

CITATION LIST

Patent Literature

PTL 1: JP-A-2006-328959
PTL 2: JP-A-2010-180854
PTL 3: JP-A-2006-017068
PTL 4: JP-A-2009-156203

SUMMARY OF INVENTION

Technical Problem

The general purpose engine of recoil starter type (manual start-up type) with displacement of approximately 1000 cc or less available for the bush cutter and the like is configured to have no external power source such as the battery for the purpose of further reducing the size and costs, and use power generated by the generator provided for the engine as the power source. The aforementioned engine with no battery has advantages of simple structure and reliable ignition operation.

However, the output of the above-structured engine output may be excessively large depending on the ignition timing, leading to the risk of early wear of the spark plug, and excessive heat generated in the secondary coil. For coping with the aforementioned risk, the configuration that does not particularly control the ignition timing has been increasingly employed in order to avoid the problem of excessively large output and further simplify the ignition device structure by suppressing the ignition device output through detection of the primary current and the primary voltage. As a result, the above-described device is not capable of reliably controlling the ignition timing to the desired one, thus causing the risk of failing to achieve safe and efficient engine operation, reduce the rate of fuel consumption, and establish sufficient exhaust emission control. It is necessary to additionally provide the misfire controller for controlling the misfire that would interrupt the ignition operation upon overspeed of the engine, abnormal oil level, and start-up in the clutch connection state. Furthermore, it is difficult to select the ignition timing in accordance with the engine load.

Patent Literatures 1 to 4 disclose use of control means such as the microcomputer for controlling a switching element for ignition so as to cope with the aforementioned disadvantages. The ignition device disclosed in Patent Literature 1 includes the capacitor which is charged at the forward voltage induced in the primary coil. It is therefore possible to change the ignition position up to the section past the one in which the forward voltage is induced in the primary coil, thus providing the advantage of extending the advancement width of the development position. However, the disclosed ignition device is not configured to sufficiently consider with respect to the possible failure of misfire caused by excessively small output at the set ignition timing, early wear of the spark plug caused by excessively large output, or excessive heat generation in the secondary coil.

The ignition device disclosed in Patent Literature 2 is configured to use the main power of the primary coil for ignition power, and the sub power for power source and generation of the rotation pulse, and to allow the microcomputer to control the ignition timing for setting the desired one. As the ground for the microcomputer is different from the one for the switching element, it is electrically impossible to detect the output of the main power used as the ignition power. This may cause the risk of such failures as misfire owing to the excessively small output at the set ignition timing, early wear of the spark plug owing to excessively large output, or excessive heat generation in the secondary coil.

The ignition device disclosed in Patent Literatures 3 and 4 detects the proportional voltage of the trigger coil to obtain the minimum output at the ignition timing. Variation in the trigger coil or in the voltage drop of the switching element will influence detection of the proportional voltage. This may cause the risk of failing to obtain the minimum output at the ignition timing. Furthermore, the device is not configured in consideration of excessively large output. Additionally, the device requires the trigger coil and the charging coil. It is necessary to select the suitable wire diameter for the respective coils so as to make the device compact, resulting in substantial increase in the manufacturing costs.

The present invention has been made in consideration of the above-described disadvantages of the generally employed device. It is therefore an object of the present invention to provide an ignition device of a general purpose engine of recoil starter type or manual start-up type that is simply configured without requiring the battery, which secures the power source from the low engine speed area (start-up) to allow control operation by the microcomputer. It is another object of the present invention to stabilize the output of the ignition device to avoid the excessive output.

Solution to Problem

The present invention configured to achieve the above-described object provides the internal combustion engine ignition device having a permanent magnet attached to a rotor connected to a crankshaft of an internal combustion engine so that a magnetic path is formed using the permanent magnet. The ignition device includes a core, an induced power generation coil wound over the core, a secondary coil coaxially wound on the induced power generation coil, a switching element that turns on and off the induced current generated in the induced power generation coil via rotation of the permanent magnet, a microcomputer connected to the switching element, and a rotation detection circuit connected to the microcomputer. The microcomputer drives the switching element to rapidly change the current flowing through the induced power generation coil and generate a high voltage in the secondary coil, and carries out ignition by generating spark discharge in a spark plug connected to the secondary coil to partially utilize the induced power induced in the induced power generation coil as a drive source of the microcomputer, and the power for allowing the rotation detection circuit to generate pulses. The switching element and the microcomputer use a circuit grounding as a common ground for the internal combustion engine.

Preferably, values of number of turns and wire diameter of the induced power generation coil are partially or entirely set so that drive power for the microcomputer and pulse generation power for the rotation detection circuit are obtained upon start of the internal combustion engine. The induced power generation coil is divided by an intermediate tap so as to be connected to the switching element at a position where the primary current induced in a part of the induced power generation coil is obtained upon ignition to optimally secure the secondary power for ignition in the whole rotation area. The induced power generation coil is used to generate the power for driving the microcomputer and for the rotation detection circuit to generate pulses, and to generate the power for the spark plug to carry out ignition.

The device may be configured to use a plurality of coils connected in parallel for forming a coil part divided from the induced power generation coil by the intermediate tap for power generation to carry out ignition so as to secure low impedance without changing the number of turns and the wire diameter. Furthermore, the switching element and the microcomputer use a common ground. The microcomputer may be configured to carry out ignition control in accordance with an on-off switching timing of the switching element determined by referring to a relationship between a rotational speed preliminarily stored in the microcomputer from the rotational speed of the crankshaft obtained based on a rotation pulse generated by the rotation detection circuit, and an operation timing of the switching element.

The primary current detection means is formed by connecting the microcomputer and a resistor connected between the switching element at a current discharge side and a ground. The microcomputer controls the switching element so as to allow the spark plug to have ignition in a range where the crankshaft rotates so that the primary current value detected by the primary current detection means becomes equal to or larger than a minimum value of the primary current value, which ensures ignition. Preferably, the primary current detection means is formed by connecting the microcomputer and a resistor connected between the switching element at a current discharge side and a ground. When the switching element is opened on a phase that the primary current value detected by primary current detection means exceeds a predetermined maximum value of the primary current, the microcomputer controls to open the switching element for a time period shorter than a predetermined opening time period of the switching element in accordance with the rotational speed of the crankshaft.

Advantageous Effects of Invention

In the general purpose engine of recoil starter type or manual start-up type, the primary coil of the ignition device is connected to the charging coil in series so that the forward voltage induced in the charging coil is used as the power source for the microcomputer. It is therefore possible to allow the microcomputer to carry out the control by securing the power source from the low speed area (start-up) of the simply structured engine without requiring the battery. The microcomputer is allowed to control the ignition timing in accordance with the primary current detected by the resistor connected to the switching element. This makes it possible to stabilize the output of the ignition device as well as to avoid the excessive output.

DESCRIPTION OF EMBODIMENTS

Figure 1:
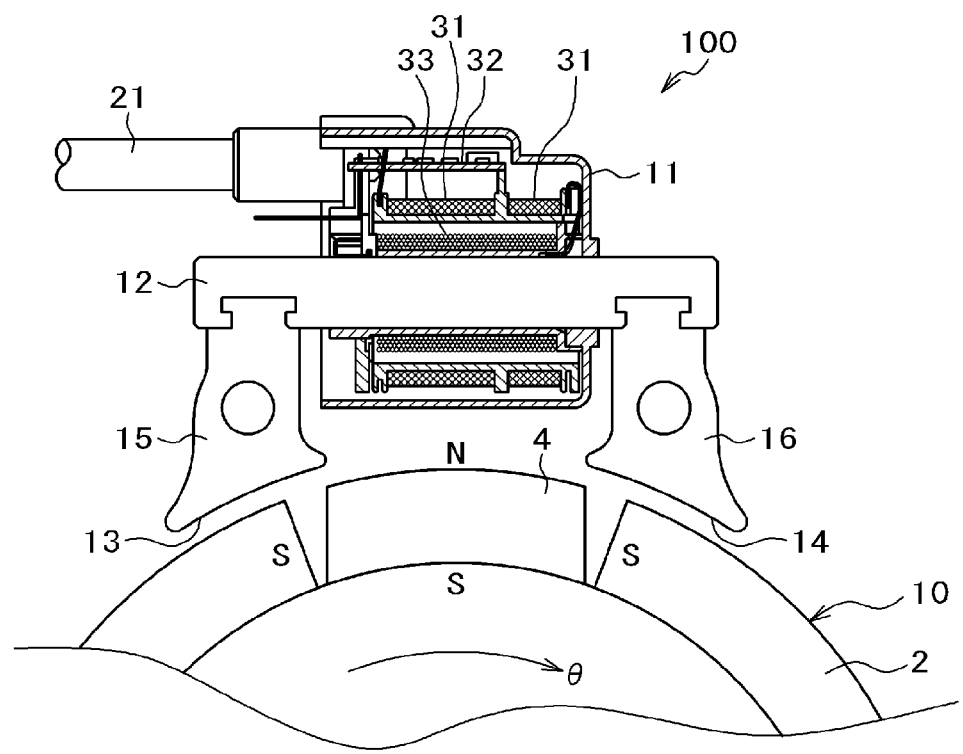
FIG. 1 is a front sectional view of an embodiment of an internal combustion engine ignition device according to the present invention.

Several embodiments of the internal combustion engine ignition device according to the present invention will be described referring to the drawings. FIG. 1 is a front view representing that an internal combustion engine ignition device 100 is mounted on an outer peripheral side of a flywheel which is connected to a crankshaft of a general purpose internal combustion engine (engine). The general purpose internal combustion engine applicable to the present invention has the displacement of approximately 1000 cc or less, and usable for the bush cutter, lawnmower, outboard motor, and the like.

The ignition device 100 is employed for the engine of recoil starter type for start-up by pulling the rope, or manual start-up type such as kick start type without using the external power source such as battery. The battery is not provided because of manual start-up type and simplified structure.

The internal combustion engine of recoil starter type is configured that a not shown crankshaft connected to the internal combustion engine is rotated by pulling the rope. The crankshaft is provided with an iron flywheel 2. Only one permanent magnet 4 magnetized in the radial direction of the flywheel 2 is fixed in a recess 5 partially formed in an outer periphery of the flywheel 2. The flywheel 2 and the permanent magnet 4 constitute a magnet rotor 10. The magnet rotor 10 forms a triple-pole magnet field including a magnetic pole outside the permanent magnet 4 (N-pole as shown in FIG. 1), and a pair of magnetic poles at both sides of the recess 5 (S-poles as shown in FIG. 1).

Meanwhile, the ignition device 100 as a stator is fixed to a case or a cover of the internal combustion engine so as to face the magnet rotor 10. The ignition device 100 has magnetic poles 13, 14 at the respective top ends opposite the magnetic pole of the magnet rotor 10, yokes 15, 16 disposed apart from each other, and a square bar-like core 12 connected to those yokes at substantially right angles. The core 12 and the yokes 15, 16 are arranged to form a C-like shape.

A coil 33 is wound over the core 12, and a secondary coil 31 is further wound on the outer peripheral side of the coil 33. The coil 33 includes a primary coil and a charging coil to be described below in detail. An outer peripheral side of the secondary coil 31 is covered with a resin case 11.

In the case 11, besides the coil 33 and the secondary coil 31, components of a primary current control circuit are mounted on a substrate 32 so as to be embedded. A high pressure cord 21 having one end connected to the secondary coil $L_2$ is drawn from one end of the case 11. The induced voltage generated in the secondary coil 31 via the high pressure cord 21 is applied to a spark plug 22 attached to the cylinder of the internal combustion engine.

Figure 2:
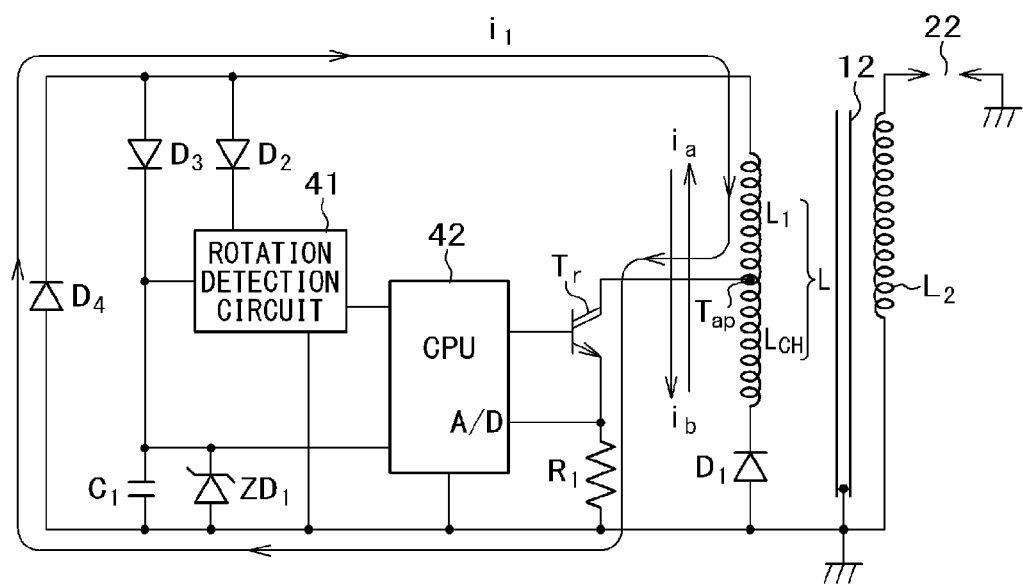
FIG. 2 is a circuit diagram of the internal combustion engine ignition device as shown in FIG. 1.
Figure 3:
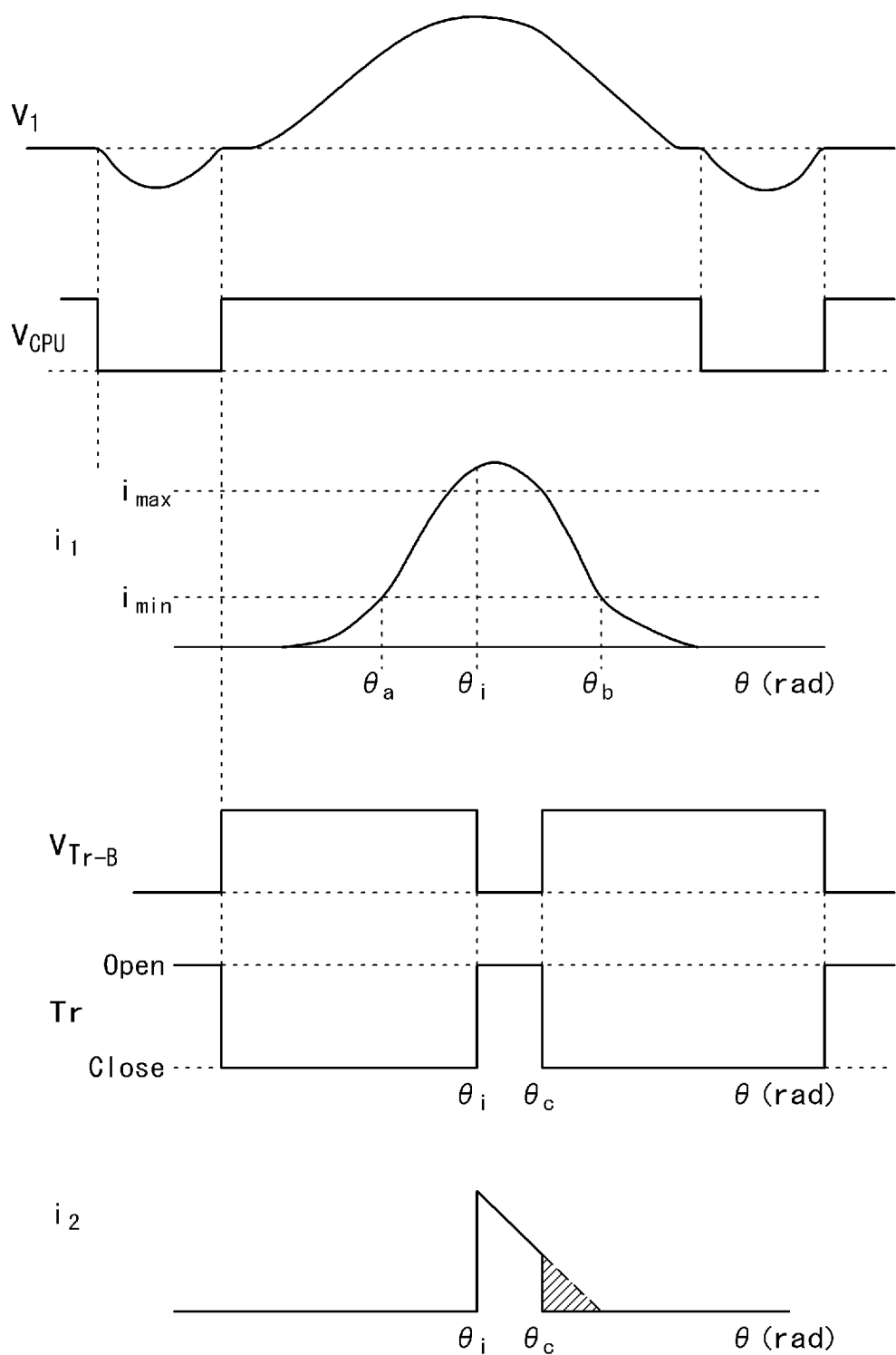
FIG. 3 is an explanatory view representing operations of a primary current, a secondary current, and a switching element in the internal combustion engine ignition device as shown in FIG. 1.

FIG. 2 is a circuit diagram showing an embodiment of the ignition device 100 according to the present invention. FIG. 3 is a view representing a current waveform and an operation state of a switching element Tr upon activation of the ignition device 100. A coil L of the ignition device 100 shown in FIG. 2 corresponds to the coil 33 shown in FIG. 1, and is formed of winding having the same wire diameter in consideration of compactness and easy fabrication of the device. The coil 33 is divided into a primary coil $L_1$ and a charging coil $L_{CH}$ by an intermediate tap Tap as a boundary therebetween. In other words, the primary coil $L_1$ and the charging coil $L_{CH}$ are connected in series via the tap Tap serving as a connection part.

The side of the primary coil $L_1$ defined by the intermediate tap Tab is connected to a collector of the power transistor Tr, serving as a circuit switching element. The part of the power transistor Tr at an emitter side is connected to a resistor $R_1$ for measuring the primary current, and the part of the power transistor Tr at a base side is connected to a CPU 42 including ROM and RAM. A diode $D_1$ is connected to an end of the charging coil $L_{CH}$ defined by the intermediate tap Tab. The secondary coil $L_2$ at one end is connected to the diode $D_1$, and at the other end is connected to the spark plug 22.

The CPU 42 is connected to a rotation detection circuit 41, and a power circuit. It is possible to use the circuit similar to the reference position detection circuit as disclosed in Patent Literature 1, for example, for the rotation detection circuit 41. The power circuit is a parallel circuit of a capacitor $C_1$ and a zener diode $ZD_1$. Diodes $D_2$ and $D_3$ are connected to the rotation detection circuit 41 and the power circuit, respectively. A diode $D_4$ is further connected in parallel with the respective circuits.

In the internal combustion engine of recoil starter type having the above-structured ignition device, the crankshaft is rotated by pulling the rope connected to the starter. Upon rotation of the crankshaft, the flywheel 2 attached to the crankshaft as shown in FIG. 1 rotates to change a magnetic flux between the permanent magnet 4 located at the outer peripheral side of the flywheel 2 and the core 12 so as to allow power generation by the coil 33 (L) of the ignition device 100, which includes the primary coil $L_1$ and the charging coil $L_{CH}$.

In the aforementioned state, as the rotation of the crankshaft allows the magnet 4 to approach the core 12, forward voltage is induced in the coil L at a slight rotation angle θ. As the crankshaft rotation further proceeds, the forward voltage is reduced so that the reverse voltage is induced while the magnet faces the core 12. The reverse voltage induced while the magnet 4 faces the core 12 will be switched to the forward voltage again just before the magnet 4 begins separating from the core 12. The induction of the forward voltage occurs only for the period at the slight rotation angle θ.

The crankshaft rotation generates the forward or reverse induced voltage in the primary coil $L_1$ and the charging coil $L_{CH}$ as described above. Therefore, the circuit shown in FIG. 2 generates AC power as indicated by ia and ib. The counterclockwise current ia shown in FIG. 2 is obtained upon generation of the forward voltage. Power derived from the current ia and the whole inductance L having the primary coil $L_1$ and the charging coil $L_{CH}$ connected in series is used for the power source of the ignition device 100 and the rotation detection circuit 41 which generates the rotation pulse, ensuring high voltage output from the optimum low speed area.

Meanwhile, the clockwise current ib shown in FIG. 2 is obtained upon generation of the reverse voltage. The current ib for imparting the voltage applied from the ignition device 100 to the spark plug 22 separates the primary coil $L_1$ from the coil L to establish the path through which the current $i_1$ flows to the transistor Tr as the switching element and the resistor R.

Specifically, the forward induced voltage having an effect on the primary coil $L_1$ and the charging coil $L_{CH}$ brings the diode $D_1$ into an energized state as well as the diodes $D_2$ and $D_3$. Accordingly, the capacitor $C_1$ of the power circuit 40 is positively charged. However, the power circuit 40 cannot supply specified power to operate the CPU 42, thus failing to apply voltage to the base of the power transistor Tr. As a result, current to be carried between the collector and the emitter of the power transistor Tr is kept cut off. In other words, as FIG. 2 shows, the current indicated by arrow la flows through the circuit including the charging coil $L_{CH}$, the primary coil $L_1$, the diode $D_3$, the capacitor $C_1$, and the diode $D_1$.

As rotation of the crankshaft proceeds to generate the reverse induced voltage in the primary coil $L_1$ and the charging coil $L_{CH}$, application of current to the diodes $D_1$ to $D_3$ is cut off and the diode $D_4$ is brought into the energized state. The zener diode $ZD_1$ allows the charge which has been discharged from the capacitor $C_1$ to increase the voltage to a predetermined value or more for applying current to the CPU 42. Having been driven by power from the power circuit 40, the CPU 42 applies the base voltage for the power transistor Tr, generating the induced current lb. For the period as described above, current is carried between the collector and the emitter of the transistor Tr so that the current $l_1$ as indicated by arrow flows through the circuit that connects the primary coil $L_1$, the transistor Tr, and the diode $D_4$.

When the rotation angle θ of the crankshaft becomes the predetermined angle, the CPU 42 cuts off the current application to the base of the power transistor Tr so that carriage of the current between the collector and the emitter of the transistor Tr is cut off. As a result, the current application to the primary coil $L_1$ is cut off, thus bringing current applied to the primary coil $L_1$ into zero. Then the induced voltage is generated in the secondary coil $L_2$. This enables application of the voltage to the spark plug 22.

Thereafter, the state where the base voltage of the transistor Tr is not applied from the CPU 42 is retained even if the crankshaft rotation proceeds. Current carried between the collector and the emitter of the transistor Tr is still kept cut off. In the case where the crankshaft rotation further proceeds to generate the induced voltage in the primary coil $L_1$ again, the charge is stored in the capacitor $C_1$ of the power circuit 40. The stored electricity is used upon next application from the secondary coil $L_2$ to the spark plug 22.

The coil L operated as described above is generally set to have high inductance sufficient to serve as the pulser coil or the charging coil $L_{CH}$. The coil L which is separated from the charging coil $L_{CH}$ by the tap Tap serves as the primary coil $L_1$. The tap Tap is disposed at the part (low impedance) with number of turns suitable for the primary coil $L_1$. This makes it possible to output high current required for the primary current $i_1$.

The above-set coil 33 (L) disposed at the primary side of the ignition coil part of the ignition device 100 allows the forward voltage to be effectively used for the power source and generation of the rotation pulse even in the low speed state upon start-up. It also allows the reverse voltage to be used for ignition so as to provide optimum ignition performance to be described below.

The optimum ignition operation by means of the power transistor Tr as the selector switch will be described referring to FIG. 3 representing the current waveform and the state of the switching element Tr. The x-axis of FIG. 3 denotes the rotation angle θ of the crankshaft as the operating angle of the internal combustion engine, corresponding to the elapsed time.

Referring to FIG. 2, the current detection resistor $R_1$ is connected to the power transistor Tr for detecting the primary current $i_1$, and the result is input to an A/D terminal of the CPU 42. In order to control the ignition timing, threshold values of the primary current $i_1$, that is, the maximum value $i_{max}$ and the minimum value $i_{min}$ are set as indicated by FIG. 3. Those values are used as described below.

The CPU 42 derives the rotational speed of the engine from the rotation pulse generated by the rotation detection circuit 41. Referring to the optimum relationship between the rotational speed and the ignition timing (rotation angle $θ_i$) in consideration of advancement preliminarily stored in the CPU 42, the CPU 42 outputs the open pulse to the switching element Tr so as to carry out ignition at the ignition timing ($θ_i$) in accordance with the rotational speed. If the ignition timing $θ_i$ set to be output from the CPU 42 has not reached the timing θa that brings the primary current $i_1$ input to the A/D input terminal into the minimum value $i_{min}$, the output timing is extended until the elapse of the timing θa which ensures to bring the primary current $i_1$ into the minimum value $i_{min}$. When the timing has reached the one $θ_a$ which brings the primary current into the minimum value $i_{min}$, a selection instruction is output to the power transistor Tr. If the ignition timing $θ_i$ set to be output is expected to possibly exceed the timing $θ_b$ which returns the primary current $i_1$ to be input to the A/D input terminal to the minimum value $i_{min}$, the output is executed at the timing $θ_b$ which returns the primary current $i_1$ to the minimum value $i_{min}$. Setting the ignition timing ensures to carry out the ignition that is hardly influenced by variations in production and component.

In the case where the primary current $i_t$ exceeds the maximum value $i_{max}$ at the ignition timing $θ_i$ upon output to the switching element Tr by the CPU 42, the switching element Tr is opened in response to the output. For the purpose of preventing excessive ignition energy, the CPU 42 outputs the pulse for closing the switching element Tr after the elapse of the preliminarily set time $θ_c$. The detailed description as described above is expressed in FIG. 3.

The top section of FIG. 3 represents the induced voltage $V_1$ generated in the primary coil $L_1$, and the second section represents the input voltage $V_{CPU}$ to be input from the rotation detection circuit 41 to the CPU 42. The third section represents the induced current $i_1$ generated in the primary coil $L_1$. The fourth section represents the input voltage $V_{Tr\text{-}B}$ to be input from the CPU 42 to the base of the power transistor Tr. The section immediately below represents the state where the power transistor Tr is switched by the input voltage $V_{Tr\text{-}B}$. The lowermost section is a timing chart of the induced current $i_2$ generated in the secondary coil $L_2$.

This makes it possible to suppress the secondary current $i_2$ to flow through the secondary coil $L_2$ and the spark plug 22 for the time period equal to or shorter than the set time period, and to prevent release of energy in excess by amount corresponding to the shaded section of FIG. 3. As a result, it is possible to prevent wear of the spark plug 22 and excessive heat generated in the secondary coil $L_2$ owing to generation of excessive ignition energy.

As aforementioned, the embodiment is configured to use the induced voltage generated in the primary coil, not only the reverse induced voltage contributing to application to the spark plug but also the forward induced voltage for the CPU power source via mutual induction between the permanent magnet attached to the outer periphery of the flywheel and the primary coil opposite the permanent magnet. This allows the CPU to timely control the timing for cutting off the primary coil. As the circuit for detecting the current flowing through the primary coil is connected to the switching element, through which the resultant output is input to the CPU for controlling the timing for opening the switching element and the opening time period, excessive ignition energy may be prevented from being unnecessarily applied to the spark plug and the secondary coil.

It is possible to appropriately select the wire diameter and the number of turns of the charging coil suitable for the use as the CPU power source, and those of the coil suitable for the use as the primary coil of the ignition coil. Unlike the case where the same coil is used both for the CPU power source and the primary coil, the power source function and the cut-off operation may be executed more reliably. In the case where the common coil is used to secure the power source, it is necessary to increase the forward induced voltage. In such a case, improper ignition is likely to be induced. Meanwhile, the embodiment is configured to ensure prevention of the improper ignition of the spark plug reliably. In the embodiment, although the primary coil is enlarged for the purpose of realizing the required number of turns, the resultant structure is simplified, leading to easy manufacturing.

Figure 4:
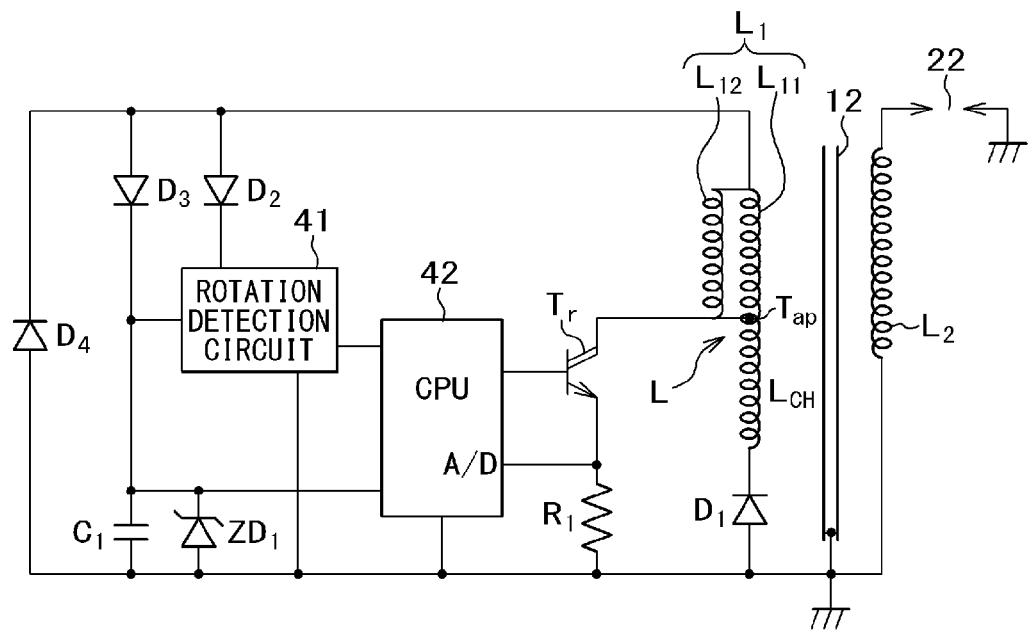
FIG. 4 is a circuit diagram of another embodiment of the internal combustion engine ignition device according to the present invention.
Figure 5:
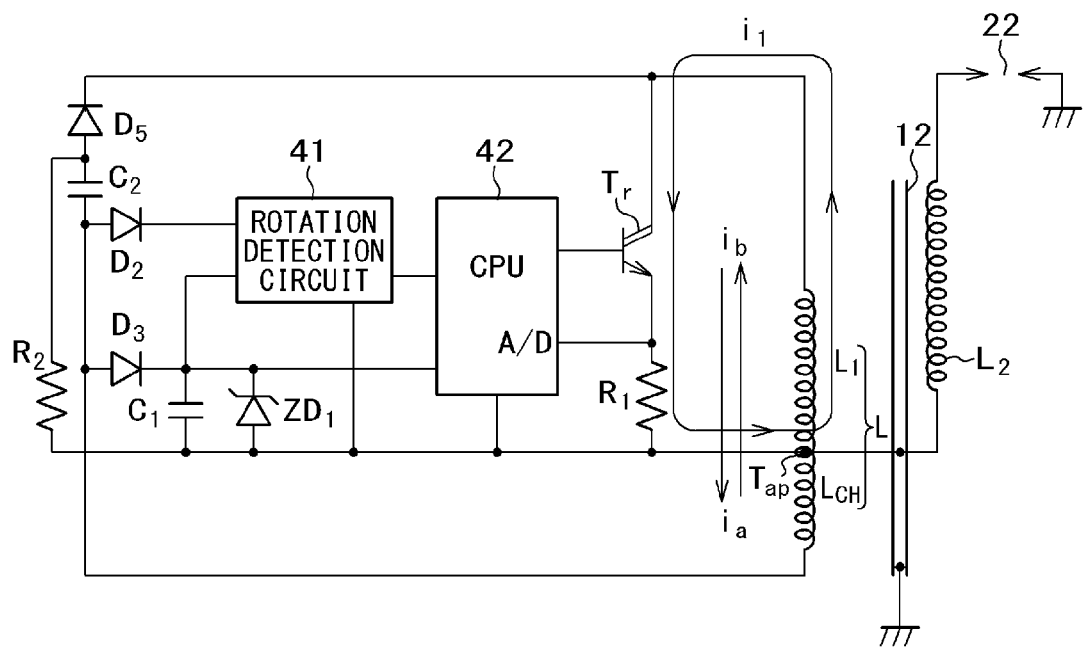
FIG. 5 is a circuit diagram of yet another embodiment of the internal combustion engine ignition device according to the present invention.
Figure 6:
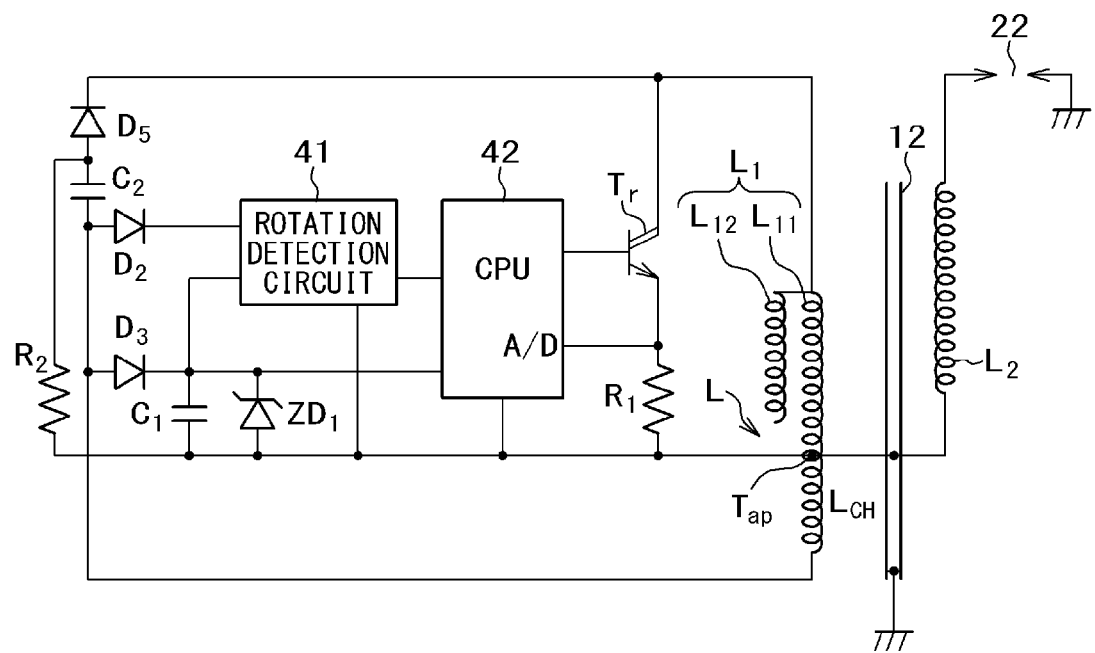
FIG. 6 is a circuit diagram of still another embodiment of the internal combustion engine ignition device according to the present invention.

Other embodiments of the ignition device according to the present invention are shown in FIGS. 4 to 6. FIG. 4 is a circuit diagram of another embodiment of the ignition device. The embodiment shown in FIG. 4 is different from the one shown in FIG. 2 in that the primary coil $L_1$ includes two coils $L_{11}$ and $L_{12}$ connected in parallel, and the coil $L_{11}$ is separated from the charging coil $L_{CH}$ by the tap Tab. Other features are the same as those shown in FIG. 2. In this embodiment, the coil with the same wire diameter is used for forming the primary coil $L_1$ and the charging coil $L_{CH}$, and the primary coils are connected in parallel for obtaining the necessary number of turns. This makes it possible to prevent enlargement of the primary coil, ensuring to realize the compact ignition device with reduced size, which is capable of controlling the ignition timing.

FIGS. 5 and 6 show circuit diagrams of other embodiments of the ignition device according to the present invention. FIG. 5 is a view representing the embodiment corresponding to the one shown in FIG. 2, and FIG. 6 is a view representing the embodiment corresponding to the one shown in FIG. 4.

In any of the embodiments, it is possible to use the induced voltage generated in the primary coil, not only the reverse induced voltage contributing to application to the spark plug but also the forward induced voltage for the CPU power source. This allows the CPU to timely control the cut-off timing of the primary coil. The detected current flowing through the primary coil to the CPU is AD input so as to control the timing for opening the switching element and the opening time period. This makes it possible to ensure stable output, and prevent application of excessive ignition energy to the spark plug and the secondary coil.

REFERENCE SIGNS LIST

2: flywheel, 3: magnet rotor, 4: (permanent) magnet, 10: magnet rotor, 11: case, 12: core, 13,14: magnetic pole, 15,16: yoke, 21: high voltage terminal, 22: spark plug, 31: secondary coil, 32: control substrate, 33: coil part, 41: rotation detection circuit, 42: CPU (microcomputer), 100: ignition device, $C_1, C_2$: capacitor, $D_1$-$D_5$: diode, $i_1$,ia,ib: primary current, L: coil part, $L_1$: primary coil, $L_2$: secondary coil, $L_{CH}$: charging coil, $R_1$: (current detection) resistor, $R_2$: resistor, Tap: (intermediate) tap, Tr: power transistor (switching element), $ZD_1$: zener diode

The invention claimed is:

1. An internal combustion engine ignition device having a permanent magnet attached to a rotor connected to a crankshaft of an internal combustion engine so that a magnetic path is formed using the permanent magnet, the ignition device comprising a core, an induced power generation coil wound over the core, a secondary coil coaxially wound on the induced power generation coil, a switching element that turns on and off the induced current generated in the induced power generation coil via rotation of the permanent magnet, a microcomputer connected to the switching element, and a rotation detection circuit connected to the microcomputer, wherein:
the microcomputer drives the switching element to rapidly change the current flowing through the induced power generation coil and generate a high voltage in the secondary coil, and carries out ignition by generating spark discharge in a spark plug connected to the secondary coil to partially utilize the induced power induced in the induced power generation coil as a drive source of the microcomputer, and the power for allowing the rotation detection circuit to generate pulses;
values of number of turns and wire diameter of the induced power generation coil are partially or entirely set so that drive power for the microcomputer and pulse generation power for the rotation detection circuit are obtained upon start of the internal combustion engine;
the induced power generation coil is divided by an intermediate tap so as to be connected to the switching element at a position where the primary current induced in a part of the induced power generation coil is obtained upon ignition to optimally secure the secondary power for ignition in the whole rotation area; and
the induced power generation coil is used to generate the power for driving the microcomputer and for the rotation detection circuit to generate pulses, and to generate the power for the spark plug to carry out ignition.

2. The internal combustion engine ignition device according to claim 1, wherein a plurality of coils connected in parallel are used for forming a coil part divided from the induced power generation coil by the intermediate tap for power generation to carry out ignition so as to secure low impedance without changing the number of turns and the wire diameter.

3. The internal combustion engine ignition device according to claim 1, wherein the microcomputer carries out ignition control in accordance with an on-off switching timing of the switching element determined by referring to a relationship between a rotational speed preliminarily stored in the microcomputer from the rotational speed of the crankshaft obtained based on a rotation pulse generated by the rotation detection circuit, and an operation timing of the switching element.

4. The internal combustion engine ignition device according to claim 3, wherein the microcomputer controls the operation timing of the switching element based on various detection pulses in addition to the rotation pulse.

5. An internal combustion engine ignition device having a permanent magnet attached to a rotor connected to a crankshaft of an internal combustion engine so that a magnetic path is formed using the permanent magnet, the ignition device comprising a core, an induced power generation coil wound over the core, a secondary coil coaxially wound on the induced power generation coil, a switching element that turns on and off the induced current generated in the induced power generation coil via rotation of the permanent magnet, a microcomputer connected to the switching element, and a rotation detection circuit connected to the microcomputer, wherein:
the microcomputer drives the switching element to rapidly change the current flowing through the induced power generation coil and generate a high voltage in the secondary coil, and carries out ignition by generating spark discharge in a spark plug connected to the secondary coil to partially utilize the induced power induced in the induced power generation coil as a drive source of the microcomputer, and the power for allowing the rotation detection circuit to generate pulses;
a primary current detection means is formed by connecting the microcomputer and a resistor connected between the switching element at a current discharge side and a ground; and
the microcomputer controls the switching element so as to allow the spark plug to have ignition in a range where the crankshaft rotates so that the primary current value detected by the primary current detection means becomes equal to or larger than a minimum value of the primary current value, which ensures ignition.

6. An internal combustion engine ignition device having a permanent magnet attached to a rotor connected to a crankshaft of an internal combustion engine so that a magnetic path is formed using the permanent magnet, the ignition device comprising a core, an induced power generation coil wound over the core, a secondary coil coaxially wound on the induced power generation coil, a switching element that turns on and off the induced current generated in the induced power generation coil via rotation of the permanent magnet, a microcomputer connected to the switching element, and a rotation detection circuit connected to the microcomputer, wherein:

the microcomputer drives the switching element to rapidly change the current flowing through the induced power generation coil and generate a high voltage in the secondary coil, and carries out ignition by generating spark discharge in a spark plug connected to the secondary coil to partially utilize the induced power induced in the induced power generation coil as a drive source of the microcomputer, and the power for allowing the rotation detection circuit to generate pulses;

a primary current detection means is formed by connecting the microcomputer and a resistor connected between the switching element at a current discharge side and a ground; and when the switching element is opened on a phase that the primary current value detected by primary current detection means exceeds a predetermined maximum value of the primary current, the microcomputer controls to open the switching element for a time period shorter than a predetermined opening time period of the switching element in accordance with the rotational speed of the crankshaft.

* * * * *